(12) United States Patent
Hirata et al.

(10) Patent No.: US 12,441,008 B2
(45) Date of Patent: Oct. 14, 2025

(54) BENDING STRUCTURE AND CONDUCTIVE DEVICE

(71) Applicant: NHK SPRING CO., LTD., Kanagawa (JP)

(72) Inventors: Takafumi Hirata, Kanagawa (JP); Yuki Hotoda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/275,805

(22) PCT Filed: Feb. 24, 2022

(86) PCT No.: PCT/JP2022/007542
§ 371 (c)(1),
(2) Date: Aug. 3, 2023

(87) PCT Pub. No.: WO2022/181671
PCT Pub. Date: Sep. 1, 2022

(65) Prior Publication Data
US 2024/0116195 A1    Apr. 11, 2024

(30) Foreign Application Priority Data
Feb. 25, 2021    (JP) .................... 2021-029086

(51) Int. Cl.
*B25J 17/02*     (2006.01)
*B25J 19/00*     (2006.01)

(52) U.S. Cl.
CPC ........... *B25J 17/02* (2013.01); *B25J 19/0025* (2013.01)

(58) Field of Classification Search
CPC ......................... B25J 17/02; B25J 19/0025
See application file for complete search history.

(56) References Cited

U.S. PATENT DOCUMENTS

| | | |
|---|---|---|
| 5,322,064 A | 6/1994 | Lundquist |
| 5,482,054 A | 1/1996 | Slater et al. |
| 2007/0021749 A1 | 1/2007 | Suzuki et al. |

FOREIGN PATENT DOCUMENTS

| | | |
|---|---|---|
| DE | 822044 C * | 11/1951 |
| EP | 0397489 A1 * | 11/1990 |
| EP | 2777561 | 9/2014 |
| JP | 2007244783 | 9/2007 |
| JP | 2014176483 | 9/2014 |
| JP | 2017080142 | 5/2017 |

(Continued)

OTHER PUBLICATIONS

"Written Opinion of the International Searching Authority (Form PCT/ISA/237) of PCT/JP2022/007542," mailed on May 10, 2022, with English translation thereof, pp. 1-6.

(Continued)

*Primary Examiner* — William C Joyce
(74) *Attorney, Agent, or Firm* — JCIPRNET

(57) ABSTRACT

A bending structure includes a bending part, which has an inner coil part and an outer coil part that are elastically bendable and stretchable, and in which a corresponding winding section of the inner coil part is fit in a space between adjacent winding sections of the outer coil part. At least one of the inner coil part and the outer coil part is conductive and forms a conductive path.

7 Claims, 6 Drawing Sheets

(56) References Cited

FOREIGN PATENT DOCUMENTS

JP        2020026019        2/2020

OTHER PUBLICATIONS

"International Search Report (Form PCT/ISA/210) of PCT/JP2022/007542", mailed on May 10, 2022, with English translation thereof, pp. 1-4.
"Search Report of Europe Counterpart Application No. 22759706.9", issued on Dec. 23, 2024, p. 1-p. 10.

* cited by examiner

BENDING STRUCTURE AND CONDUCTIVE DEVICE

CROSS-REFERENCE TO RELATED APPLICATION

This application is a 371 application of the International PCT application serial no. PCT/JP2022/007542, filed on Feb. 24, 2022, which claims the priority benefits of Japan Patent Application No. 2021-029086, filed on Feb. 25, 2021. The entirety of each of the above-mentioned patent applications is hereby incorporated by reference herein and made a part of this specification.

BACKGROUND

Technical Field

The invention relates to a bending structure and a conductive device capable of realizing a joint function of a robot, a manipulator, etc.

Description of Related Art

A bending structure that realizes a joint function of a robot, a manipulator, or an actuator, etc., may be required to have a conductive function, depending on the machine to which the bending structure is applied.

As a bending structure with such conductive function, for example, Patent Document 1 discloses a curved part. The curved part is a bending structure applied to a medical manipulator, and supports an end effector with respect to a shaft.

A conductive wire is inserted through an axial central part of the curved part. The conductive wire functions as a cable for mechanically driving the end effector and is able to conduct power to the end effector.

However, in such structure, the conductive wire needs to be inserted to the end effector, and it is difficult to reduce the diameter of the bending structure.

Such issue occurs in a bending structure in which a conductive function is widely required.

PRIOR ART DOCUMENT(S)

[Patent Document(s)]
[Patent Document 1] Japanese Laid-open No. 2014-176483

SUMMARY

[Issues to be Solved by the Invention]
The issue to be solved is that there is a limit to the reduction in the diameter of a bending structure that requires a conductive function.

[Means for Solving the Issues]
The invention is mainly characterized in that a bending structure includes: a bending part, which has an inner coil part and an outer coil part that are elastically bendable and stretchable, and in which a corresponding winding section of the inner coil part is fit in a space between adjacent winding sections of the outer coil part, and at least one of the inner coil part and the outer coil part is conductive and forms a conductive path.

[Inventive Effects]
According to the invention, with the bending part, the conductive path can be formed stably without the need of another conductive line, and the diameter of the bending structure can be reduced.

Figure 2:
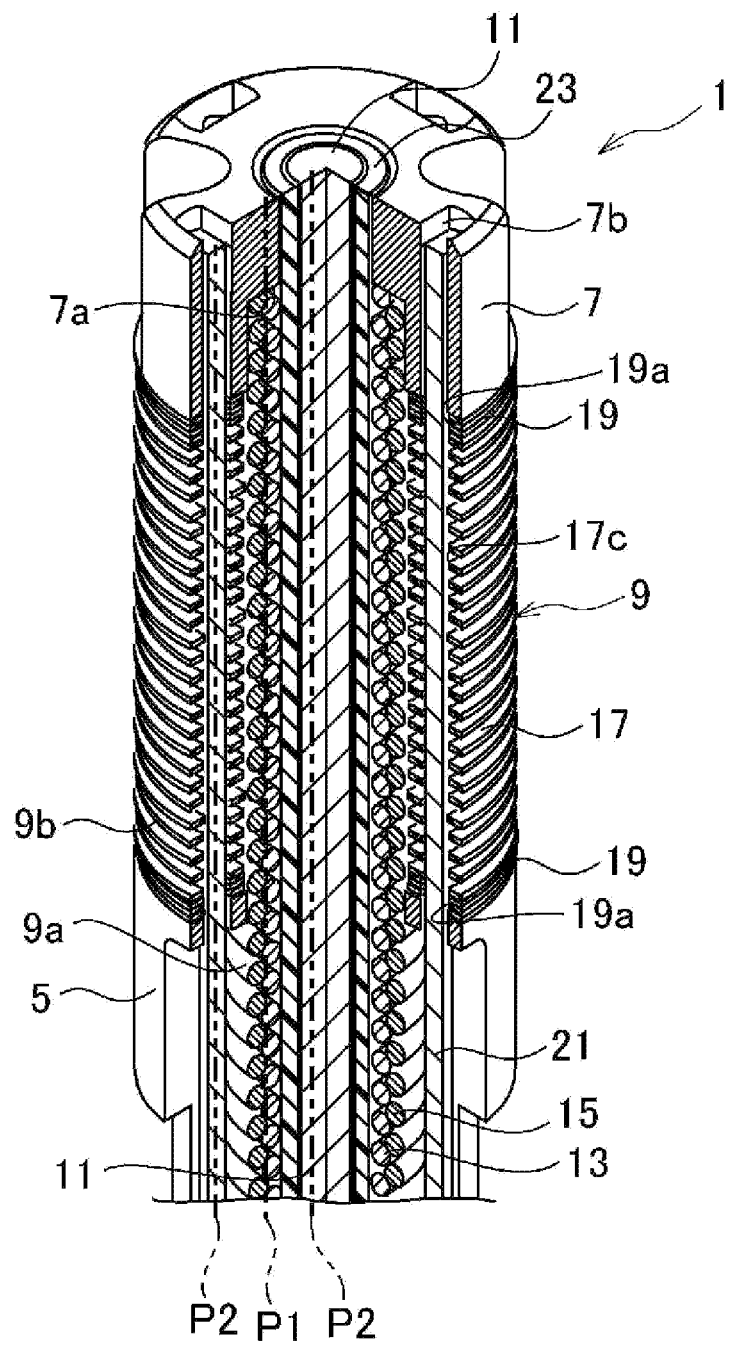
FIG. 2 is a perspective cross-sectional view illustrating a portion of the bending structure of FIG. 1.
Figure 3:
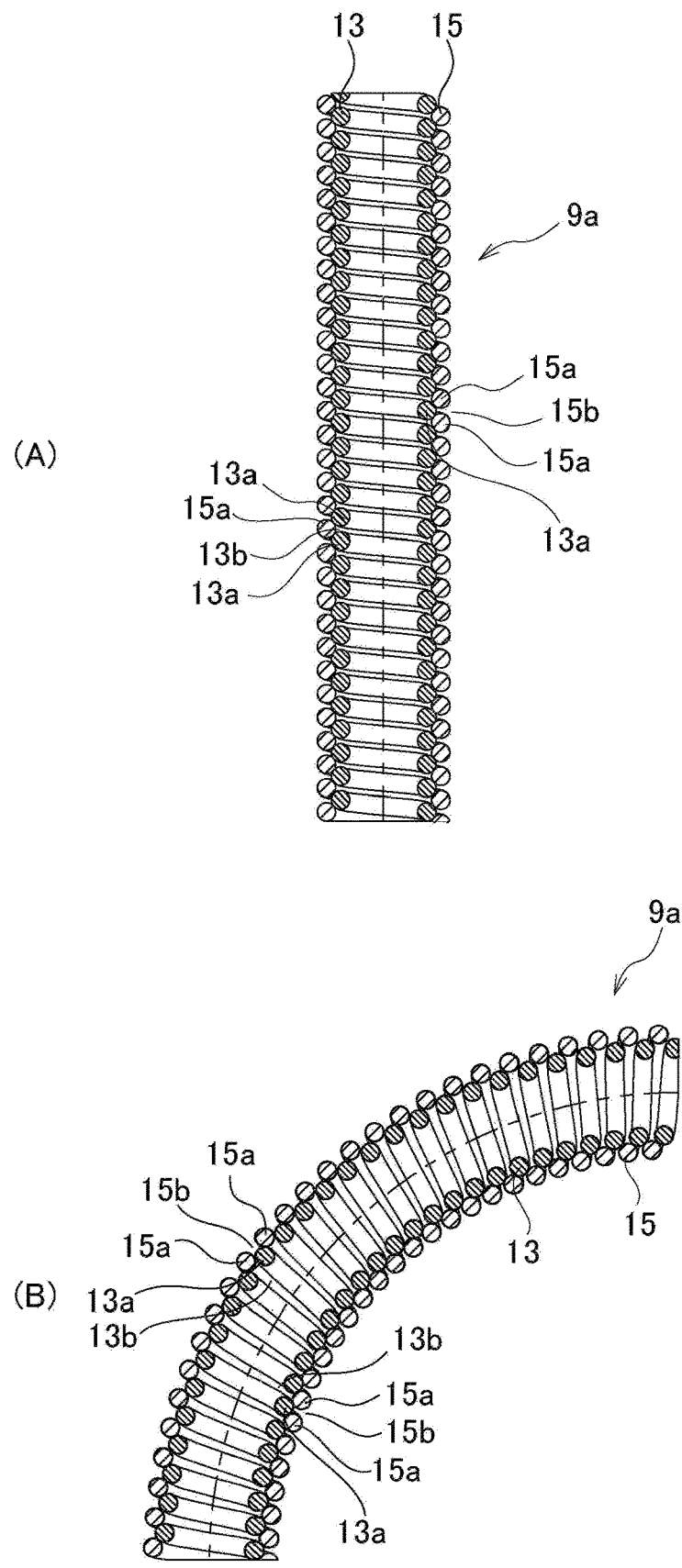

(A) and (B) of FIG. 3 are cross-sectional views illustrating an inner cylinder of the bending structure of FIG. 2, where (A) of FIG. 3 illustrates the default case, and (B) of FIG. 3 illustrates the time of being bent.

Figure 4:
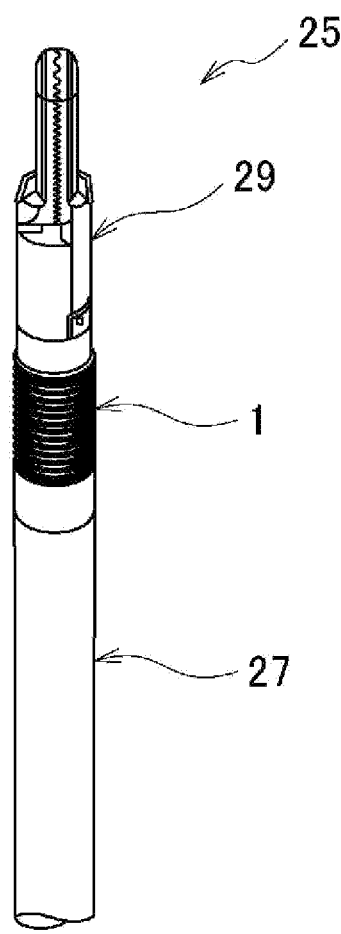

FIG. 4 is a perspective view illustrating a conductive device to which a bending structure is applied according to Embodiment 2 of the invention.

Figure 5:
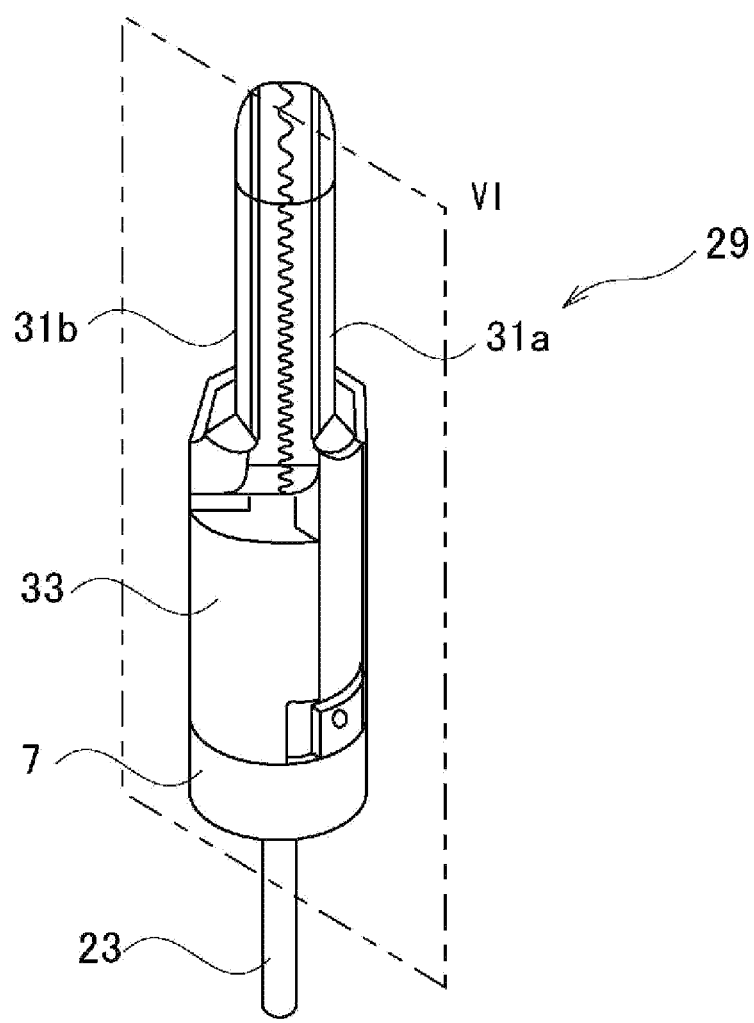

FIG. 5 is an enlarged perspective view illustrating the periphery of an end effector of the conductive device of FIG. 4.

Figure 6:
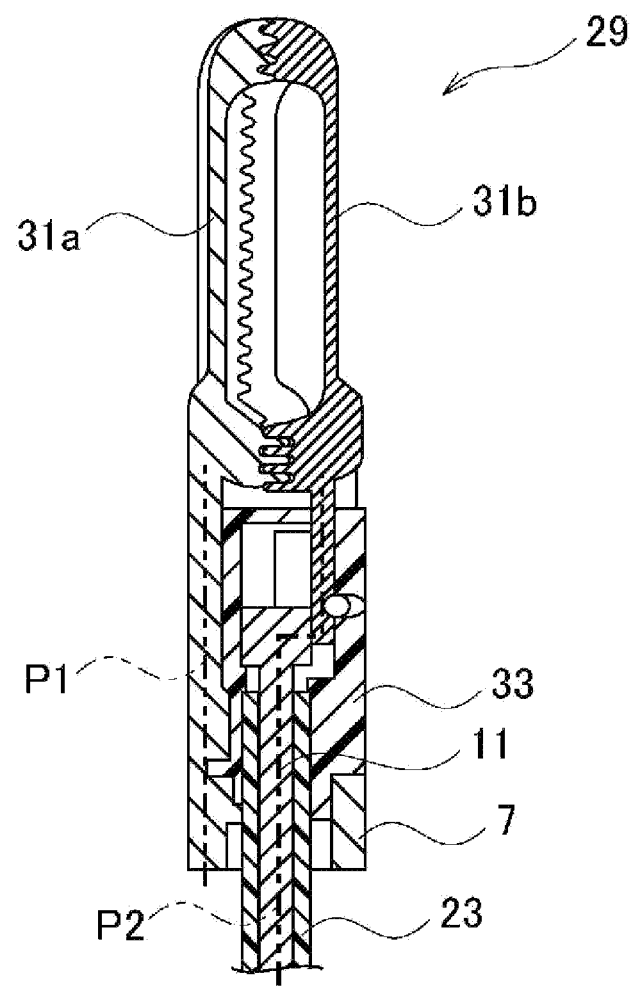

FIG. 6 is a cross-sectional view taken along a cutting plane VI of FIG. 5.

DESCRIPTION OF THE EMBODIMENTS

A purpose of reducing the diameter of a bending structure requiring a conductive function is realized through a configuration in which a conductive path is formed by using a bending part of a double coil. The bending part has an inner coil part and an outer coil part that are elastically bendable and stretchable. In the bending part, a corresponding winding section of the inner coil part is fit in a space between adjacent winding sections of the outer coil part.

That is, a bending structure (1) includes a bending part (9) having an inner coil part (13) and an outer coil part (15). The inner coil part and the outer coil part (13, 15) are elastically bendable and stretchable. A corresponding winding section (13a) of the inner coil part (13) is fit in a space (15b) between adjacent winding sections (15a) of the outer coil part (15). At least one of the inner coil part and the outer coil part (13, 15) is conductive and forms a conductive path (P1).

It may be configured that one or both of the inner coil part and the outer coil part (13, 15) is conductive and form the conductive path (P1). It may also be configured that, in the case where both of the inner coil part and the outer coil part (13, 15) are conductive, the inner coil part and the outer coil part (13, 15) are insulated from each other, and the conductive path (P1) is formed by only one of the inner coil part and the outer coil part (13, 15).

It may also be configured that, in the case where both of the inner coil part and the outer coil part (13, 15) are conductive, and the inner coil part and the outer coil part (13, 15) are insulated from each other, the conductive path (P1) is formed by one of the inner coil part and the outer coil part (13, 15), and the other of the inner coil part and the outer coil part (13, 15) forms another conductive path.

It may also be configured that the bending structure (1) includes an end member (7) that is conductive and connected with an end part of at least one of the inner coil part and the outer coil part (13, 15) forming the conductive path, and the end member (7) forms the conductive path (P1) with at least one of the inner coil part and the outer coil part (13, 15).

The bending structure may include a flexible member (11) that is conductive and provided on an inner side of the inner coil part (13). In such case, it may also be configured that the flexible member (11) is insulated from at least one of the inner coil part and the outer coil part (13, 15) forming the conductive path (P1) and forms another conductive path (P2).

Here, the at least one of the inner coil part and the outer coil part (13, 15) forming the conductive path (P1) refers to the one of the inner coil part and the outer coil part (13, 15) that is conductive in the case where one of the inner coil part and the outer coil part (13, 15) is conductive. In addition, in the case where both of the inner coil part and the outer coil part (13, 15) are conductive, the at least one of the inner coil part and the outer coil part (13, 15) forming the conductive path (P1) refers to both of the inner coil part and the outer coil part (13, 15) if it is configured that both of the inner coil part and the outer coil part (13, 15) form the conductive path (P1), and refers to only one of the inner coil part and the outer coil part (13, 15) if it is configured that the inner coil part and the outer coil part (13, 15) are insulated from each other and only one of the inner coil part and the outer coil part (13, 15) forms the conductive path (P1).

The bending structure may include a cord-like member being conductive and provided on an outer side of the outer coil part (15). In such case, it may be configured that the cord-like member (21) is insulated from at least one of the inner coil part and the outer coil part (13, 15) forming the conductive path (P1) and forms another conductive path (P2).

A conductive device (25) using such bending structure (1) has an electrode member (31a, 31b) that is conductive and connected with the conductive path (P1) formed by at least one of the inner coil part and the outer coil part (13, 15) that are conductive.

It may also be configured that the conductive device (25) includes: a first electrode member (31a), being conductive and connected with one of the conductive paths (P1, P2); a second electrode member (31b), being conductive and connected with an other of the conductive paths (P1, P2); and an insulation member (33), provided between the first electrode member (31a) and the second electrode member (31b).

In the conductive device (25), the first electrode member (31a) and the second electrode member (31b) may also be forceps members for performing a holding operation.

Embodiment 1

[Bending Structure]

Figure 1:
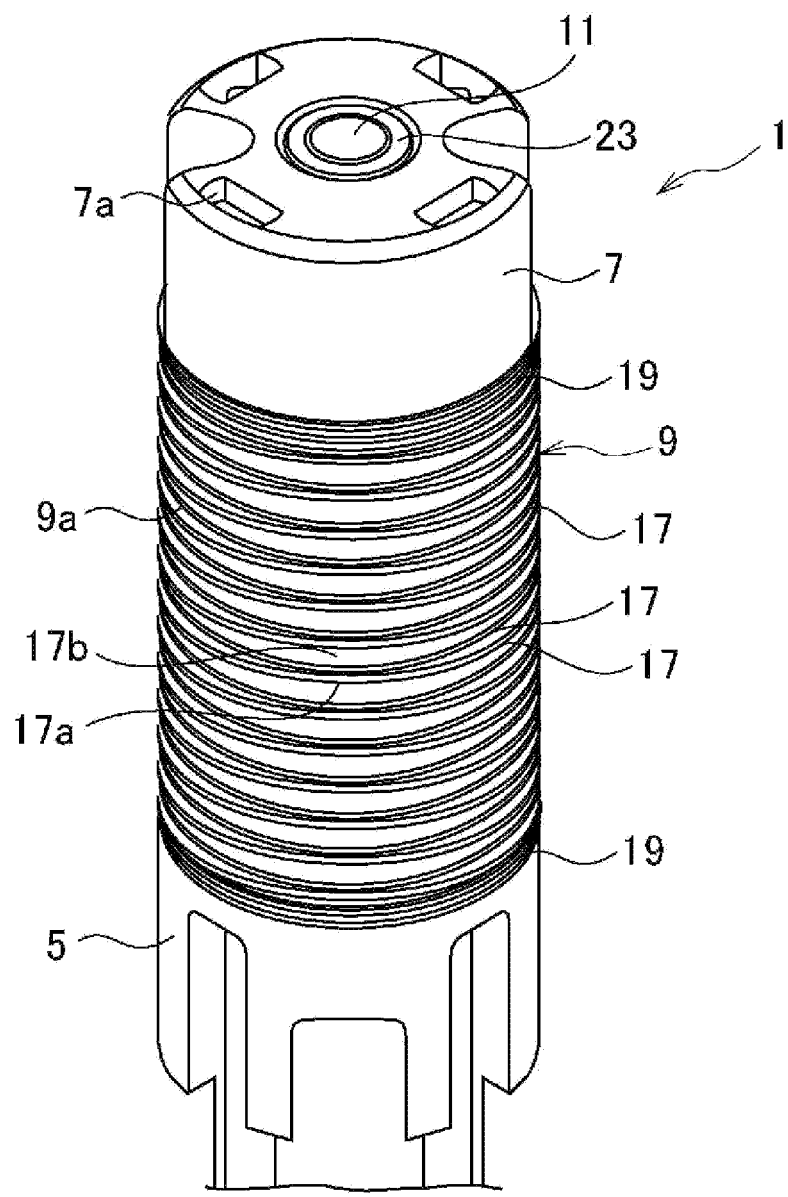
FIG. 1 is a perspective view illustrating a bending structure according to Embodiment 1 of the invention.

FIG. 1 is a perspective view illustrating a bending structure according to Embodiment 1 of the invention. FIG. 2 is a perspective cross-sectional view illustrating a portion of the bending structure. (A) and (B) of FIG. 3 are cross-sectional view illustrating an inner cylinder of the bending structure, where (A) of FIG. 3 illustrates the default case, and (B) of FIG. 3 illustrates the time of being bent.

A bending structure 1 is suitable for a joint function part requiring a conductive function in various medical or industrial machines, such as a manipulator, a robot, or an actuator. The joint function part is an apparatus, a mechanism, a device, etc., having a function as a joint that bends and stretches.

The bending structure 1 is elastically bendable and stretchable, and has a conductive path P1 from an end to the other end in the axial direction. It is noted that "axial direction" refers to the direction along the axial center of the bending structure 1, and includes a direction that is slightly inclined in addition to a direction strictly parallel to the axial center.

The bending structure 1 of the embodiment includes a base part 5 and a movable part 7 as an end member, a bending part 9, and a flexible member 11.

The base part 5 is a columnar body formed by metal, resin, etc., such as being formed by a cylindrical body. The base part 5 is attached to the end part of the shaft of the manipulator, etc. The base part 5 is not limited to a columnar body, and may be arranged in an appropriate configuration depending on the machine to which the bending structure 1 is applied.

Like the base part 5, the movable part 7 is formed by a columnar body, such as a cylindrical body. An end effector, etc., depending on the machine to which the bending structure 1 is applied, is attached to the movable part 7.

The movable part 7 of the embodiment is conductive. Regarding the material of the movable part 7 that is conductive, in addition to materials such as metals and conductive resins that themselves are conductive, it is possible to use a non-conductive material, such as resin, formed with a conductive coating.

The movable part 7 may also be configured to be not conductive. In addition, the movable part 7 may also be arranged in an appropriate configuration depending on the machine to which the bending structure 1 is applied, and is not limited to being a columnar body.

Such movable part 7 is supported by the base part 5 through the bending part 9 to be displaceable with respect to the axial direction.

The bending part 9 is formed by an inner cylinder 9a and an outer cylinder 9b disposed along the axial direction of the bending structure 1. The inner cylinder 9a is a double coil elastically bendable and stretchable with respect to the axial direction, and is formed by an inner coil part 13 and an outer coil part 15. Accordingly, when the bending part 9 (inner cylinder 9a) is bent, the space of the outer coil part 15 on the inner side of bending is decreased, and the space of the outer coil part 15 on the outer side of bending is increased. Accordingly, the length of the inner cylinder 9a at the axial center of the outer coil part 15 does not change compared to the case where the inner cylinder 9a is straight. Accordingly, in the case where the inner cylinder 9a is used to movably guide the flexible member 11e in the axial direction on the inner peripheral side of the inner cylinder 9a, the movement amount of the flexible member 11 can be reliably kept constant.

The inner coil part 13 and the outer coil part 15 are coil springs respectively having a bendable elasticity with respect to the axial direction. At least one of the inner coil part 13 and the outer coil part 15 is conductive and forms the conductive path P1.

In the embodiment, both of the inner coil part 13 and the outer coil part 15 are conductive and form the conductive path P1. The conductive path P1 is provided for a machine, such as an end effector, that requires power conduction.

It may also be configured that, in the case where both of the inner coil part 13 and the outer coil part 15 are conductive, the inner coil part 13 and the outer coil part 15 are insulated from each other, the conductive path P1 is formed by one of the inner coil part 13 and the outer coil part 15, and another conductive path is formed by the other of the inner coil part 13 and the outer coil part 15. It is possible to perform the insulation between the inner coil part 13 and the outer coil part 15 by providing an insulation coating on one of the inner coil part 13 and the outer coil part 15.

Since such conductive path P1 utilizes the inner coil part 13 and the outer coil part 15 of the bending part 9 having a bendable elasticity, even if the bending part 9 of the bending structure 1 is repetitively bent and stretched, the conductive wire may not be damaged.

The inner coil part 13 and the outer coil part 15 of the embodiment penetrates through the base part 5 in the axial direction, and the tip end part is fit into a concave part 7a of the movable part 7. The fitting into the concave part 7a is performed by abutting the end parts of the inner coil part 13 and the outer coil part 15 into the concave part 7a in the axial direction, and bringing the outer periphery of the outer coil part 15 into contact with the inner periphery of the concave part 7a in the axial direction.

Accordingly, the movable part 7 is electrically connected with the inner coil part 13 and the outer coil part 15 and forms the conductive path P1 with the inner coil part 13 and the outer coil part 15. The conductive path P1 extends from an end of the bending structure 1 to the other end in the axial direction.

In the case where the movable part 7 is not conductive, a conductive body axially penetrating through the movable part 7 may be provided, and the conductive body may be connected with at least one of the inner coil part 13 and the outer coil part 15 that are conductive.

It suffices as long as the materials of the inner coil part 13 and the outer coil part 15 that are conductive are the same as the movable part 7. In the case where one of the inner coil part 13 and the outer coil part 15 is not conductive, it suffices as long as one of the inner coil part 13 and the outer coil part 15 is formed by a non-conductive material, such as resin.

The cross-sectional shapes of the wires of the inner coil part 13 and the outer coil part 15 are circular shapes having the same wire diameter, but the cross-sectional shapes may also be semi-circular or elliptical, etc. The cross-sectional shapes and the wire diameters of the inner coil part 13 and the outer coil part 15 may also be different from each other.

The inner coil part 13 has a smaller central diameter than the outer coil part 15 and is screwed into the outer coil part 15. The central diameters of the inner coil part 13 and the outer diameter 15 are constant from one end in the axial direction to the other end. However, it is also possible that the central diameter of the outer coil part 15 changes in the axial direction.

The outer coil part 15 has multiple pitches 15b that are multiple spaces axially spacing apart winding sections 15a (adjacent winding sections 15a) adjacent in the axial direction. Corresponding winding sections 13a of the inner coil part 13 are fit with the pitches 15b from the inner side. Through such fitting, the winding section 13a of the inner coil part 13 and the adjacent winding sections 15a of the outer coil part 15 contact each other.

Meanwhile, the inner coil part 13 has multiple pitches 13b that are multiple spaces axially spacing apart winding sections 13a (adjacent winding sections 13a) adjacent in the axial direction. Corresponding winding sections 15a of the outer coil part 15 are fit with the pitches 13b from the outer side. Through such fitting, the winding sections 15a of the outer coil part 15 and the adjacent winding sections 13a of the inner coil part 13 contact each other.

With such structure, the compression of the inner cylinder 9a in the axial direction is limited, the conductive path P1 between the inner coil part 13 and the outer coil part 15 is stabilized, and the contact resistance is reduced.

The outer cylinder 9b is disposed to be concentric with the inner cylinder 9a, and is a cylindrical body covering the outer periphery of the inner cylinder 9a. The outer cylinder 9b of the embodiment is formed by laminating multiple wave washers 17 in the axial direction. The wave washers 17 adjacent in the axial direction are bonded to each other. The outer cylinder 9b is bendable through the elastic deformation of the wave washers 17.

Each wave washer 17 is formed in a closed ring shape by using a conductive or non-conductive material. Between the wave washers 17 adjacent in the axial direction, a crest 17a of one of the wave washers 17 is in contact with a trough 17b of the other wave washer 17, and the crest 17a and the trough 17b that are in contact are bonded by an appropriate means, such as welding, adhering, etc.

Multiple flat washers 19 with a deformation amount smaller than the wave washers 17 are attached to the two end parts of the outer cylinder 9b in the axial direction. The two end parts of the outer cylinder 9b are combined with the base part 5 and the movable part 7 via the flat washers 19. The combination may be performed by a suitable means, such as welding. The flat washers 19 may also be omitted.

In the outer cylinder 9b, insertion holes 17c, 19a in communication in the axial direction are provided between the crest 17a and the trough 17b of each wave washer 17 and a portion of the flat washer 19 corresponding thereto. The insertion holes 17c, 19a of the embodiment are provided every 90 degrees in the circumferential direction. The numbers of the insertion holes 17c, 19a may also be changed so as to be provided every 60 degrees, every 120 degrees, every 180 degrees, etc., in the circumferential direction.

A driving wire 21 is inserted in the axial direction through the insertion holes 17c, 19c. Accordingly, the outer cylinder 9b functions as a guide for holding the driving wire 21 at a predetermined position on the outer side of the outer coil part 15 of the inner cylinder 9a.

It is noted that the outer cylinder 9b is not limited to being formed by laminating the wave washers 17, and may also be formed by other flexible components. For example, the outer cylinder 9b may also be formed by bellows formed by a tubular body with a corrugated cross-sectional shape or a double coil like the inner cylinder 9a.

The driving wire 21 is a cord-like member along the axial direction of the bending structure 1. The cord-like member is not limited to a wire, but may also be a stranded wire, a single wire, a piano wire, an articulated rod, a chain, a cord, a string, a rope, etc.

Other than being circular like the insertion holes 17c, 19a of the outer cylinder 9b, the cross-sectional shape of the driving wire 21 may also have a different shape such as an elliptical shape, a rectangular shape, etc.

The driving wire 21 can be formed by a conductive or non-conductive material. In any case, the driving wire 21 exhibits a flexible property to an extent that does not interfere with the bending and stretching of the bending structure 1.

In the case where the driving wire 21 is formed by a conductive material, if the driving wire 21 is insulated from the inner coil part 13 and the outer coil part 15 that are conductive, it is possible to form another conductive path P2 by using the driving wire 21.

The insulation of the driving wire 21 from the inner coil part 13 and the outer coil part 15, for example, can be realized by coating the driving wire 21 itself with an insulation body, or forming the movable part 7 by using a non-conductive material and coating the outer side of the outer coil part 15 of the inner cylinder 9a by using an insulation body or adopting a non-conductive material for the outer coil part 15, etc.

The tip end part of the driving wire 21 is positioned in a connection hole 7b provided at the movable part 7, and is retained by being engaged with the movable part 7 through end part processing, etc. The base end part of the driving wire 21 is directly or indirectly connected with an operation mechanism not shown herein.

By being operated in the axial direction, the driving wire 21 is able to drive the movable part 7 with respect to the base part 5. Specifically, by pulling the driving wire 21 in the axial direction, the movable part 7 is driven to bend the bending structure 1. The quantity of the driving wire 21 can be set as appropriate depending on the required bending operation of the bending structure 1.

The flexible member 11 is a driving member formed by a push-pull cable or an air tube, or other flexible elongated components, depending on the machine to which the bending structure 1 is applied. In the embodiment, the flexible member 11 is a push-pull cable.

The flexible member 11 is provided on the inner side of the inner coil part 13 of the inner cylinder 9a. The flexible member 11 can be formed by a conductive or non-conductive material, and exhibits a flexible property to an extent that does not interfere with the bending and stretching of the bending structure 1.

In the case where the flexible member 11 is formed by a conductive material, the flexible member 11 can be insulated from the inner coil part 13 and the outer coil part 15 that are conductive to form another conductive path P2.

The conductive path P2 may be selectively formed by one of the flexible member 11 and the driving wire 21. In addition, it may also be that the flexible member 11 and the driving wire 21 are both arranged as conductive paths, and three or more conductive paths are provided. In addition, the conductive path P2 may also be formed by a component other than the flexible member 11 and the driving wire 21. Furthermore, in the case of an end effector, etc., that requires monopolar power conduction, for example, the conductive path P2 may be omitted.

The insulation of the flexible member 11 from the inner coil part 13 and the outer coil part 15 may be performed through a flexible tube 23.

The flexible tube 23 is a cylindrical component formed by a resin, etc., exhibiting an insulating property, and exhibits a flexibility to an extent that does not interfere with the bending and stretching of the bending structure 1. The flexible tube 23 is inserted into the inner coil part 13 of the inner cylinder 9a, and is interposed between the inner coil part 13 and the flexible member 11.

The insulation of the flexible member 11 from the inner coil part 13 and the outer coil part 15 may also be performed by adopting an insulating material for the inner coil part 13. In addition, depending on the machine, one or both of the flexible member 11 and the flexible tube 23 may be omitted.

[Operation, Etc.]

In the bending structure 1 of the embodiment, as shown in (A) of FIG. 3, at the time of being straight without being bent (at the time of being stretched), the corresponding winding sections 13a of the inner coil part 13 are fit between the adjacent winding sections 15a of the outer coil part 15 of the inner cylinder 9a.

Therefore, in the bending structure 1, even with the acting of a compression force in the axial direction, the inner coil part 13 and the outer coil part 15 of the inner cylinder 9a are not compressed. The length of the central part can be maintained, and the posture is stable.

At this time, with the adjacent winding sections 15a of the outer coil part 15 and the winding sections 13a of the inner coil part 13 of the inner cylinder 9a contacting each other, the conductive path P1 is formed in the winding direction of the inner coil part 13 and the outer coil part 15 and the axial direction.

The conductive path P1 that is formed is stable without excessive deformation in accordance with the posture of the bending structure 1. In addition, in accordance with the contact pressure between the winding sections 15a of the outer coil part 15 and the winding sections 13a of the inner coil part 13, the contact resistance of the conductive path P1 is reduced, and the conductive path P1 is electrically stable.

In the bending structure 1, the operator can pull one or more driving wires 21 and direct the end effector, etc., of the machine to which the bending structure 1 is applied to a desired direction.

When the driving wire 21 is pulled, as shown in (B) of FIG. 3, on the inner side of bending, the pitch 15b between the adjacent winding sections 15a of the outer coil part 15 of the inner cylinder 9a is decreased, and, on the outer side of bending, the pitch 15b between the adjacent winding sections 15a of the outer coil part 15 of the inner cylinder 9a is increased. Meanwhile, the length of the central part of the inner cylinder 9a remains the same. That is, compared with the time of being straight, the length of the axial center of the outer coil part 15 does not change, and the posture of the bending structure 1 is stable.

Through the elastic deformation of the wave washers 17, the outer cylinder 9b bends together with the inner cylinder 9a.

When the inner cylinder 9a bends, the inner coil part 13 of the inner cylinder 9a is pushed toward the outer side of bending. The push of the inner coil part 13 is tolerated by the increased pitch 15b between the adjacent winding sections 15a of the outer coil part 15 of the inner cylinder 9a on the outer side of bending. Therefore, the bending operation can be performed smoothly.

Moreover, at the time of bending, the corresponding winding section 13a of the inner coil part 13 continue to fit between the adjacent winding sections 15a of the outer coil part 15 of the inner cylinder 9a.

Therefore, like the time of being straight, the compression of the bending structure 1 in the axial direction can be suppressed, and the change of the length of the central part can be suppressed.

As a result, at the time of bending as well, with the adjacent winding sections 15a of the outer coil part 15 and the winding sections 13a of the inner coil part 13 of the inner cylinder 9a contacting each other, the conductive path P1 is stably and reliably formed.

[Effects of Embodiment 1]

As described above, the bending structure 1 of the embodiment includes the bending part 9. The bending part 9 has the inner coil part 13 and the outer coil part 15 that are elastically bendable and stretchable, and the corresponding winding section 13a of the inner coil part 13 is fit in a space between the adjacent winding sections 15a of the outer coil part 15. At least one of the inner coil part 13 and the outer coil part 15 is conductive and forms the conductive path P1.

Accordingly, in the bending structure 1, through the bending part 9, the conductive path P1 can be formed stably without the need of another conductive wire, and the diameter can be reduced. In addition, in the bending structure 1, the structure can be simplified.

In addition, by forming the conductive path P1 by using at least one of the inner coil part 13 and the outer coil part 15 of the bending part 9, compared with the case where another conductive wire is used, the damage to the conductive path P1 due to repetitive bending and stretching can be suppressed. In addition, the compression of the bending part 9 before, after, and during bending is suppressed, the bending part 9 does not deform excessively, and the conductive path P1 can be formed stably.

In addition, in the embodiment, both of the inner coil part 13 and the outer coil part 15 are conductive and form the conductive path P1.

Accordingly, with the adjacent winding sections 15a of the outer coil part 15 and the winding sections 13a of the inner coil part 13 of the inner cylinder 9a contacting each other, the conductive path P1 can be formed in the axial direction in addition to the winding direction of the inner coil part 13 and the outer coil part 15. The conductive path P1 can be electrically stable in accordance with the contact pressure between the winding sections 15a of the outer coil part 15 and the winding sections 13a of the inner coil part 13.

In addition, the bending structure 1 includes the movable part 7 as an end member that is conductive and connected with the end part of one of the inner coil part 13 and the outer coil part 15 that are conductive. The movable part 7 forms the conductive path P1 with the inner coil part 13 and the outer coil part 15.

Accordingly, the movable part 7 can be used as a terminal or an electrode of the bending structure 1 with respect to an end effector, etc., and the structure can be simplified.

The flexible member 11 that is conductive is provided on the inner side of the inner coil part 13. The flexible member 11 can form another conductive path P2 as long as the flexible member 11 is insulated from the inner coil part 13 and the outer coil part 15 forming the conductive path P1.

Accordingly, the conductive path P2 can be formed by using the flexible member 11 such as a push-pull cable. In such case, the another current path P2 can be formed on the inner side of the coil part 13 which is affected less by bending.

In addition, since the conductive path P2 is provided separately from the conductive path P1 formed by at least one of the inner coil part 13 and the outer coil part 15, the need for a conventional branch is not required.

As a result, even if the conductive paths P1 and P2 are provided, the structure can be simplified. In addition, since the conductive path P2 may be configured by a single conductive path P2, the thickness of the inner coil part 13 on the inner side does not become thicker than necessary, and the increase in the bending radius can be suppressed.

In the embodiment, the driving wire 21, which is a conductive cord-like member, is provided on the outer side of the outer coil part 15. If insulated from the inner coil part 13 and the outer coil part 15 forming the conductive path P1, the driving wire 21 can form another conductive path P2.

In such case, another conductive path P2 can be formed by using the driving wire 21, and a conventional branch is not required. In addition, since the driving wire 21 is significantly thinner than a push-pull cable, the bending radius can be reliably suppressed.

Embodiment 2

FIG. 4 is a perspective view illustrating a conductive device to which a bending structure is applied according to Embodiment 2 of the invention. FIG. 5 is an enlarged perspective view illustrating the periphery of an end effector of the conductive device. FIG. 6 is a cross-sectional view taken along a cutting plane VI of FIG. 5. In addition, in Embodiment 2, like symbols are labeled for components corresponding to Embodiment 1, and the repetitive description is omitted.

In the embodiment, a conductive device 25 is formed by applying the bending structure 1 of Embodiment 1. The conductive device 25 is a medical manipulator. However, the invention is not limited thereto.

In the conductive device 25, an end effector 29 is supported with respect to a shaft 27 through the bending structure 1.

The shaft 27 is formed in a hollow tubular shape, such as a cylindrical shape, by using metal, etc. The bending structure 1 is attached to the tip end of the shaft 27. The shaft 27 functions as a base supporting the bending structure 1. Regarding the base supporting the bending structure 1, an appropriate component may be used in place of the shaft 27 in accordance with the machine to which the bending structure 1 is applied.

The end effector 29 is a bipolar forceps in the embodiment. However, the end effector 29 is not limited to a forceps, but may also be bipolar scissors, an electric scalpel, etc. The end effector 29 may also be a monopolar electric scalpel.

The end effector 29 is formed by including forceps members 31a and 31b as a first electrode member and a second electrode member and an insulation member 33.

The forceps members 31a and 31b perform a holding operation by opening and closing. The forceps members 31a and 31b are formed by a conductive material, and are respectively connected with the conductive path P1 and the conductive path P2. The connection destinations of the forceps members 31a and 31b may also be the conductive paths P2 and P1, opposite to the above. The conductive path P2 of the embodiment is formed by the flexible member 11.

The base end part of one (the forceps member 31a) of the forceps members is supported by the movable part 7 of the bending structure 1 and connected with the conductive path P1. The forceps member 31a is fixed to be used. The other (the forceps member 31b) of the forceps members is combined with the tip end of the flexible member 11 and connected with the conductive path P2. The forceps member 31b is axially supported by the insulation member 33 with respect to the base end part of the forceps member 31a, and performs the holding operation with respect to the forceps member 31a through forward/backward movement of the flexible member 11.

The insulation member 33 is an insulating columnar body whose cross-section is fan-shaped. The insulation member 33 is attached to the base end part of the forceps member 31a. The inside of the insulation member 33 is hollow and accommodates the tip ends of the flexible member 11 and the flexible tube 23. The tip end of the flexible member 11 is combined with the forceps member 31b inside the insulation member 33.

In Embodiment 2, the structure of the bipolar conductive device 25 can be simplified.

In the case where the conductive device 25 is of a monopolar type, the conductive device 25 can be coped with by using the conductive path P1 only without requiring the conductive path P2, and the structure can be simplified.

In addition, Embodiment 2 can attain the same effects as those of Embodiment 1.

What is claimed is:
1. A bending structure, comprising:
a bending part, which has an inner coil part and an outer coil part that are elastically bendable and stretchable, and in which a corresponding winding section of the inner coil part is fit in a space between adjacent winding sections of the outer coil part, wherein at least one of the inner coil part and the outer coil part is conductive and forms a conductive path;

a flexible member, being conductive and provided on an inner side of the inner coil part, wherein the flexible member is insulated from at least one of the inner coil part and the outer coil part forming the conductive path and forms another conductive path; and an end member that is conductive and connected with an end part of at least one of the inner coil part and the outer coil part forming the conductive path, wherein the end member forms the conductive path with at least one of the inner coil part and the outer coil part.

2. The bending structure as claimed in claim 1, wherein both of the inner coil part and the outer coil part are conductive and form the conductive path.

3. A conductive device, using the bending structure as claimed in claim 1, wherein the conductive device has an electrode member that is conductive and connected with the conductive path formed by the at least one of the inner coil part and the outer coil part that are conductive.

4. A bending structure, comprising:

a bending part, which has an inner coil part and an outer coil part that are elastically bendable and stretchable, and in which a corresponding winding section of the inner coil part is fit in a space between adjacent winding sections of the outer coil part, wherein at least one of the inner coil part and the outer coil part is conductive and forms a conductive path;

a driving wire, being conductive and provided on an outer side of the outer coil part, wherein the driving wire is insulated from at least one of the inner coil part and the outer coil part forming the conductive path and forms another conductive path; and an end member that is conductive and connected with an end part of at least one of the inner coil part and the outer coil part forming the conductive path, wherein the end member forms the conductive path with at least one of the inner coil part and the outer coil part.

5. A conductive device, using the bending structure as claimed in claim 4, comprising:

a first electrode member, being conductive and connected with one of the conductive paths;

a second electrode member, being conductive and connected with an other of the conductive paths; and an insulation member, provided between the first electrode member and the second electrode member.

6. The conductive device as claimed in claim 5, wherein the first electrode member and the second electrode member are forceps members for performing a holding operation.

7. A bending structure, comprising:

a bending part, which has an inner coil part and an outer coil part that are elastically bendable and stretchable, and in which a corresponding winding section of the inner coil part is fit in a space between adjacent winding sections of the outer coil part, wherein at least one of the inner coil part and the outer coil part is conductive and forms a conductive path, wherein both of the inner coil part and the outer coil part are conductive, the inner coil part and the outer coil part are insulated from each other, the conductive path is formed by one of the inner coil part and the outer coil part, and another conductive path is formed by an other of the inner coil part and the outer coil part; and an end member that is conductive and connected with an end part of at least one of the inner coil part and the outer coil part forming the conductive path, wherein the end member forms the conductive path with at least one of the inner coil part and the outer coil part.

* * * * *